(12) United States Patent
Alexander et al.

(10) Patent No.: US 9,237,024 B2
(45) Date of Patent: Jan. 12, 2016

(54) INFORMATIONAL BROADCAST MESSAGES AND ITS USES IN WIRELESS MULTIHOP NETWORKS

(71) Applicant: Cooper Technologies Company, Houston, TX (US)

(72) Inventors: Roger Alexander, Rockville, MD (US); Shashikant Chowdhary, Germantown, MD (US); Steven Baigal, Clarksburg, MD (US); Sergey Sukhobok, Rockville, MD (US); Sharif M. Redwan Siddiqui, Germantown, MD (US); Shravan Rangaraju, Clarksburg, MD (US)

(73) Assignee: Cooper Technologies Company, Houston, TX (US)

( * ) Notice: Subject to any disclaimer, the term of this patent is extended or adjusted under 35 U.S.C. 154(b) by 339 days.

(21) Appl. No.: 13/839,653

(22) Filed: Mar. 15, 2013

(65) Prior Publication Data

US 2014/0269278 A1    Sep. 18, 2014

(51) Int. Cl.
*G01R 31/08*    (2006.01)
*G06F 11/00*    (2006.01)
(Continued)

(52) U.S. Cl.
CPC ................ *H04L 12/18* (2013.01); *H04L 51/38* (2013.01); *H04W 76/002* (2013.01); *H04W 40/24* (2013.01); *H04W 84/18* (2013.01)

(58) Field of Classification Search
CPC ... H04W 8/005; H04W 24/02; H04W 40/244; H04W 84/18
USPC .......................................................... 370/230
See application file for complete search history.

(56) References Cited

U.S. PATENT DOCUMENTS 6,707,425 B2    3/2004    Louhi
7,002,917 B1    2/2006    Saleh
(Continued)

FOREIGN PATENT DOCUMENTS

JP    04862082    1/2012
WO    WO2011083389    7/2011
WO    WO2012056088    5/2012

OTHER PUBLICATIONS

Jun et al., "MRP: Wireless Mesh Networks Routing Protocol", Department of Electrical and Computer Engineering. North Carolina University. 2008.
(Continued)

*Primary Examiner* — Faruk Hamza
*Assistant Examiner* — Shah R Zaman
(74) *Attorney, Agent, or Firm* — Patterson Thuente Pedersen, P.A.

(57) ABSTRACT

In a wireless multihop network having node devices within communication range neighboring node devices in a corresponding local neighborhood, the node devices generate visibility messages to be transmitted via connection-less broadcast. The visibility messages include at least an identifier of the corresponding node device. Visibility messages received by each of the node devices from the one or more neighboring node devices are processed to determine a measure of density of the local neighborhood. This measure of density also accounts for the heterogeneous transmit power capabilities of node devices and is used for updating of one or more operational parameter of the node device relating to utilization of the radio communications medium by that node device. A degree of utilization of the medium through the control of transmission data rate and power is adjusted based on an inverse relation to the measure of density determined from the received visibility messages.

20 Claims, 7 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/18* (2006.01)
*H04W 76/00* (2009.01)
*H04L 12/58* (2006.01)
*H04W 40/24* (2009.01)
*H04W 84/18* (2009.01)

(56) References Cited

U.S. PATENT DOCUMENTS

| | | | |
|---|---|---|---|
| 7,069,483 B2 | 6/2006 | Gillies et al. | |
| 7,471,647 B2 | 12/2008 | Ge et al. | |
| 7,542,421 B2 | 6/2009 | Srikrishna et al. | |
| 7,570,593 B1 | 8/2009 | ElBatt et al. | |
| 7,660,315 B2 | 2/2010 | Kodialam et al. | |
| 7,668,173 B2 | 2/2010 | Zhao | |
| 7,936,709 B2 | 5/2011 | Bhatti et al. | |
| 8,014,346 B2 | 9/2011 | Chu et al. | |
| 8,031,686 B2 * | 10/2011 | Li et al. | 370/342 |
| 8,032,146 B2 | 10/2011 | Zhu et al. | |
| 8,085,686 B2 | 12/2011 | Thubert et al. | |
| 8,089,881 B2 | 1/2012 | Walton et al. | |
| 8,189,506 B2 | 5/2012 | Kneckt et al. | |
| 8,243,601 B2 | 8/2012 | Li et al. | |
| 8,331,396 B2 | 12/2012 | Hiertz et al. | |
| 8,364,085 B2 | 1/2013 | Barnum | |
| 2002/0094797 A1 | 7/2002 | Marshall et al. | |
| 2004/0230638 A1 | 11/2004 | Balachandran et al. | |
| 2005/0058141 A1 | 3/2005 | Lee | |
| 2005/0058151 A1 | 3/2005 | Yeh | |
| 2005/0088988 A1 * | 4/2005 | Kwon et al. | 370/328 |
| 2006/0268924 A1 | 11/2006 | Marinier et al. | |
| 2007/0242621 A1 | 10/2007 | Nandagopalan et al. | |
| 2007/0245034 A1 | 10/2007 | Retana et al. | |
| 2007/0271234 A1 | 11/2007 | Ravikiran | |
| 2008/0144493 A1 | 6/2008 | Yeh | |
| 2008/0182607 A1 | 7/2008 | Behroozi et al. | |
| 2008/0198036 A1 | 8/2008 | Songkakul et al. | |
| 2008/0247327 A1 | 10/2008 | Weil et al. | |
| 2009/0005052 A1 | 1/2009 | Abusch-Magder et al. | |
| 2009/0059873 A1 | 3/2009 | Weil et al. | |
| 2009/0238075 A1 | 9/2009 | Mosko | |
| 2009/0252127 A1 | 10/2009 | Rangarajan et al. | |
| 2009/0296674 A1 * | 12/2009 | Ekl et al. | 370/338 |
| 2009/0296704 A1 | 12/2009 | Kim et al. | |
| 2011/0026500 A1 | 2/2011 | Shaffer et al. | |
| 2011/0110303 A1 | 5/2011 | Bahr | |
| 2011/0143806 A1 | 6/2011 | Song et al. | |
| 2011/0164527 A1 | 7/2011 | Mishra et al. | |
| 2011/0223952 A1 | 9/2011 | Nanda et al. | |
| 2012/0057494 A1 | 3/2012 | Walton et al. | |
| 2012/0063364 A1 | 3/2012 | Emmelmann et al. | |
| 2012/0106522 A1 | 5/2012 | Reumerman et al. | |
| 2012/0140678 A1 | 6/2012 | Veillette | |
| 2012/0230370 A1 | 9/2012 | Shaffer et al. | |
| 2012/0243408 A1 | 9/2012 | Leppanen et al. | |
| 2012/0307697 A1 | 12/2012 | Mukhopadhyay | |
| 2012/0314660 A1 | 12/2012 | Leppanen et al. | |
| 2013/0191688 A1 * | 7/2013 | Agarwal et al. | 714/32 |
| 2013/0268654 A1 * | 10/2013 | Abraham et al. | 709/224 |

OTHER PUBLICATIONS

Pietilainen et al., "Social Pocket Switched Networks", INFOCOM Workshops. Apr. 2009.
International Search Report and Written Opinion for International Application No. PCT/US2014/011261 dated Apr. 29, 2014.

* cited by examiner

INFORMATIONAL BROADCAST MESSAGES AND ITS USES IN WIRELESS MULTIHOP NETWORKS

FIELD OF THE INVENTION

The invention relates generally to data communications via wireless multihop networks and, more particularly, to managing communications efficiency and congestion in high-density environments.

BACKGROUND OF THE INVENTION

A wireless multihop communications network, such as a mesh network, includes a set of node devices capable of exchanging messages with one another over a wireless medium, typically using radio frequency (RF) airwaves. Each of the node devices can be primarily a communications device or, alternatively, the communications functionality may be secondary to its primary function. For example, in a given node, the communications circuitry can be a part of a device such as a computer system, a smart appliance, a vehicle, a media device, a piece of industrial equipment (e.g., an instrument, machine, sensor, actuator), and the like. In a mesh architecture the node devices are uniquely addressable, and able to route messages from an originating node device toward the intended destination node. In general, each of the node devices can be an originating and destination node device as well. Thus, node devices perform both, message forwarding, and message origination/consumption functions. This means that the communication channels can be quite busy at certain parts of the network where node density is high and the message density is relatively higher than at other parts.

Wireless networks in particular face other challenges. For instance, wireless links may not always be reliable: there may be intermittent interfering signals, intermittent obstructions, including large movable objects (e.g., vehicles) moving in and out of the transmission path, weather affecting the quality of radio signal propagation, etc., affecting the signal strength of transmissions seen by the receiving node. Also, certain node devices may be situated near the limits of their radio's communication range, which further compounds signal reception challenges.

For node devices in wireless mesh networks, having multiple neighboring node devices through which communications can be sent and received is advantageous in several respects. In general, having a higher number of neighbors is better in terms of increasing coverage and providing an ability to select higher-quality communications paths. A higher count of neighbors also provides robustness and self-healing capability in the mesh network by supporting a diversity of alternative communications paths.

In a wireless mesh network with very high neighbor density, it is possible to have hundreds or even thousands of neighboring node devices within communication range of one another. This situation can come into play particularly when node devices are able to transmit at high power levels, thereby reaching more distant node devices. In spite of the advantages of having multiple neighbors, there is an important trade-off: maintaining a high number of neighbors is costly in terms of memory and processing capacity needed in each of the node devices. These added costs can be significant particularly for node devices deigned to be low-cost.

Maintaining neighbors typically involves establishing periodic communications between devices and re-evaluating the links to each neighbor in order to coordinate network routing and communicating functions. Specific information is gathered and exchanged between individual sets of neighboring devices to allow network connectivity and route optimizing decisions to be made. Therefore, the greater the density of deployed devices, in terms of number of visible radio neighbors in a given geographic area, the greater is the system overhead that may be associated with the communications and data exchanges that occurs among neighbors.

If not properly controlled, communicating with a large number of neighbors can take up a significant portion of the available communications capacity in the network neighborhood, which can degrade overall radio link performance. Increased communications in high-density networks, even those due to messages for neighbor management, result in an increased rate at which messages "collide"—i.e., interfere with one another, preventing reception of one or more of the transmitted messages. Communications received with errors detected therein must be re-transmitted, which uses additional communication overhead in the system, thereby further aggravating the problem.

A solution is therefore needed that improves the communications performance in high-density wireless mesh networks.

SUMMARY OF THE INVENTION

Embodiments of the invention address one or more of the challenges discussed above to improve the RF communications in wireless mesh networks, particularly in dense environments, utilizing connection-less broadcasts as visibility messages that report, to neighboring node devices, their presence, along with some indicia of their usefulness as neighbors in communicating messages.

One aspect of the invention is directed to a node device for use with a wireless multihop network having node devices within communication range of their immediate one or more neighboring node devices located in a corresponding local neighborhood. The node device comprises communication circuitry, and a controller interfaced with the communication circuitry. The controller includes a processor and a non-transitory data storage medium containing instructions executable on the processor, that, when executed, cause the controller to implement a neighborhood management module. The neighborhood management module includes a visibility message generation module that generates visibility messages to be transmitted via connection-less local radio broadcast, with the visibility messages including at least an identifier of the node device. The neighborhood management module further includes a received visibility message assessment module that processes visibility messages received by the node device from the one or more neighboring node devices to determine a measure of density of the local neighborhood. Further, the neighborhood management module includes a management module that initiates updating of an operational parameter of the node device relating to utilization of communications air time by the communication circuitry. A degree of utilization of the communications air time by the node device is adjusted (at least in part) in inverse relation to the measure of density determined based on the received visibility messages.

In related embodiments, visibility broadcasts may also provide routing information that allows nodes to specifically target subsets of candidate neighbors for initiating connections for further routing information exchange. The broadcast information also supports autonomous adaptation where nodes use the neighbor density information in conjunction with measured communications link statistics to guide the transmission choices applied for communications with each individual neighbor.

In a related aspect of the invention, a method is provided for operating a node device in a wireless multihop network. The method includes:

generating visibility messages to be transmitted via connection-less broadcast, the visibility messages including at least an identifier of the node device;

processing visibility messages received by the node device from the one or more neighboring node devices to determine a measure of density of the local neighborhood; and initiating updating of at least one operational parameter of the node device relating to utilization of communications medium by the node device, wherein a degree of utilization of the communications medium, through for example the adaptation of the transmission data rates and transmit power levels is adjusted in inverse relation to the measure of density determined based on the received visibility messages and, optionally, on measured link quality statistics.

Advantageously, the information provided by the connection-less broadcast visibility messages allow neighboring devices to assess their immediate neighborhood environment, and to make various decisions designed to improve their communications performance based on that assessment. In various embodiments, operational parameters, such as transmit power levels, operating data rates, or both, may be adjusted according to the assessed neighborhood environment, and optionally in conjunction with measured communications link statistics. In other related embodiments, endpoint devices control other operational parameters, such as the frequency (i.e., how often) the visibility messages are sent, and in some embodiments the information content within the visibility message can be adjusted based on the assessed neighborhood environment.

In other related embodiments, the information received from neighboring devices in the visibility messages sent by those devices is utilized to select some subset of all of the neighboring devices to become active neighbors with which regular communications are conducted. This approach facilitates automated management of communications overhead by reducing the number of dedicated pair-wise neighbor connections that must be regularly established as part of the usual neighbor management protocol.

In these and other embodiments, the connection-less broadcasts are employed to limit the number of neighboring devices that are required to explicitly establish communications with each other for the exchange individual device information and for purposes of refining the quality of the link to the neighbor.

The visibility broadcast according to certain embodiments also provides a mechanism to quickly disseminate network connectivity status or change information among neighbors. Limiting the number and frequency of dedicated connections between individual neighbors for such exchanges in a given environment serves to limit the amount of background, overhead system communications traffic, which in turn benefits the throughput performance that is achieved on the particular connections that must be established. In addition, the same connection-less, visibility broadcast mechanism can be applied to allow devices to intelligently assess the nature of their individual neighborhood environments to provide the information needed to narrow the optimization space for making power level and data rate adaptation decisions when communicating with particular neighbor devices.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are generally directed to adaptive communications in a heterogeneous wireless multihop network. A multihop network is one where node devices transmit data messages to one another, including through intermediate node devices that can act as routing devices for purposes of relaying data messages towards their final destination, which can be an endpoint node device on the local network, or a gateway node device that provides a connection between the local network and another network. A well-known example of a multihop network is the mesh network topology. Embodiments of the invention may be used in a variety of applications involving data communications. One such application is in energy metering, such as a radio frequency (RF) Mesh advanced metering infrastructure (AMI) network that can provide utilities with a single integrated-mesh network for electric, water and gas data communications with the ability to support multiple meter vendors. Such systems can be deployed using a licensed or unlicensed RF band. However, it should be understood that the principles of the invention are applicable in a variety of different applications besides energy metering.

Figure 1:
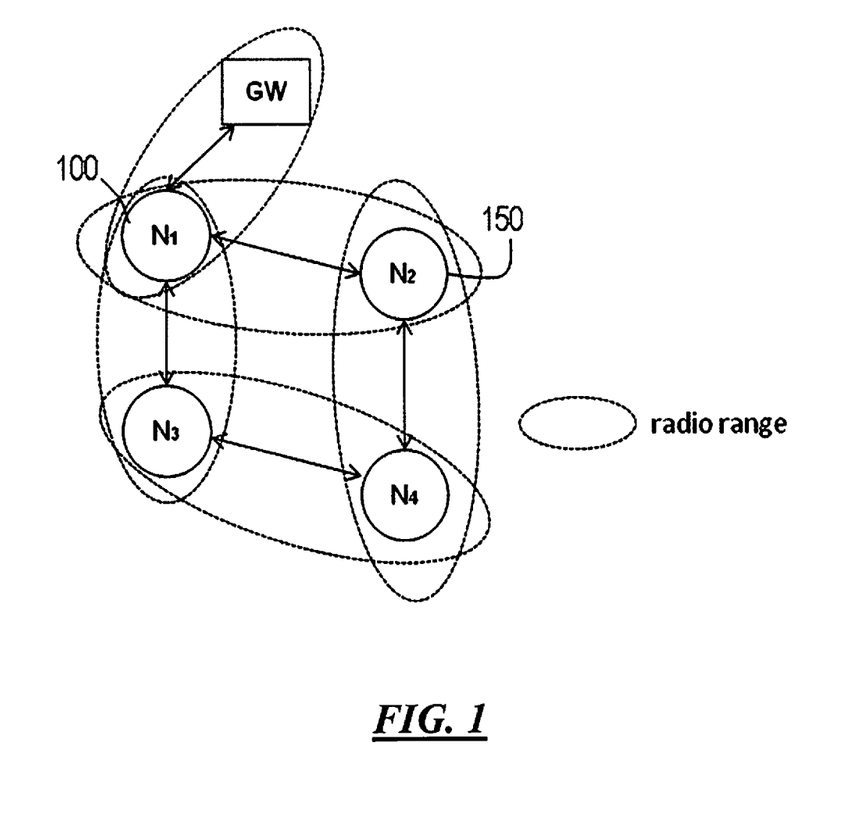
FIG. 1 is a network topology diagram illustrating an exemplary wireless multihop network in which embodiments of the invention may be applied.

FIG. 1 is a diagram illustrating an exemplary wireless multihop network. Endpoint node devices $N_1$-$N_4$ act as sources and destinations of data to be communicated, as well as relays of data to be forwarded to its destination. Gateway node device GW provides a connection between the local network and another network. The areas shown in broken lines represent the radio ranges for the various node devices. Those node devices which are within radio range are referred to herein as neighboring devices or, simply, neighbors. Thus, devices $N_1$ and $N_2$, within communications range of each other, are indicated respectively by reference numerals 100 and 150.

Figure 2:
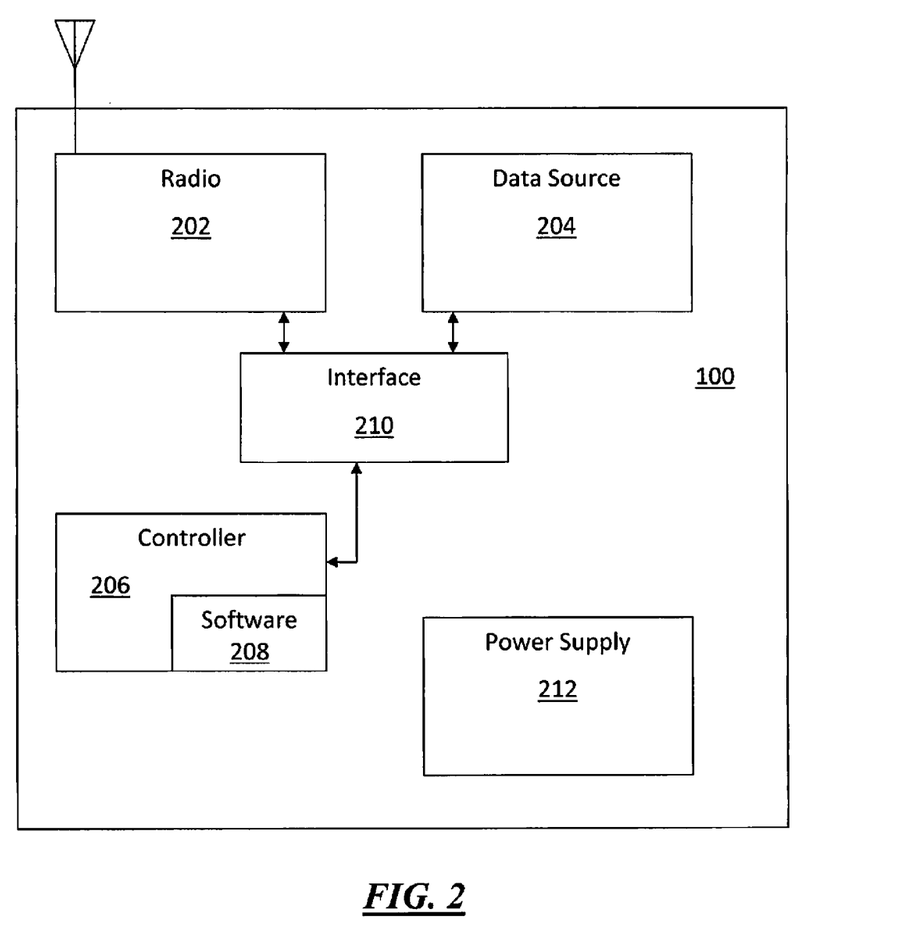
FIG. 2 is a block diagram illustrating parts of an exemplary node device according to one embodiment of the invention.

FIG. 2 is a block diagram illustrating portions of node device 100. Node device 100 includes radio circuit 202 having transmitter and receiver portions. In one example embodiment, the radio circuit is a 50-channel frequency hopping spread spectrum radio. Data source 204 is that portion of node device 100 which is served by radio circuit 202, and provides any one or more of a variety of primary functions of node device 100 besides the communication function. For example, in an AMI application, data source 204 may be a utility meter; in an industrial control application, data source 204 may be an instrument, sensor, or actuator; in an information technology application, data source 204 may be a computer system.

Controller 206 oversees and coordinates functionality of radio circuit 202 and, in some architectures that integrate the communications portion and data source portions of node device 100, controller 206 controls the operation of data source 204. In other embodiments, data source 204 can have its own controller. In one embodiment, controller 206 includes processing hardware, such as one or more processor cores, memory units (volatile, non-volatile, or both), input/output facilities, data bus, and other such processing-related components. Controller 206 also includes software 208, which in various embodiments can include an embedded system, an operating system, device drivers, and other system code. In addition, software 208 includes application-level code that defines the higher functionality of node device 100, including operation of the communications and software upgrade modules detailed hereinbelow. Interface circuit 210 facilitates input and output of application and control data between radio circuit 202 and data source 204 according to the embodiment depicted in FIG. 2. In one embodiment, interface circuit 210 includes an digital to analog (D/A) or analog to digital (A/D) circuit, or both. In related embodiments, interface circuit 210 can include one or more of: a bus circuit, a serial port, a parallel port, or any combination thereof.

Power supply circuit 212 provides electrical power for use by the other circuitry of node device 100. Various circuitry may have different power requirements, such as different supply voltages, source or ground isolation, or the like. Accordingly, power supply 212 provides the needed power requirements. In one embodiment, power supply circuit 212 includes the energy source, such as a battery, for example. In other embodiments, power supply 212 includes a power capture circuit such as a photovoltaic cell, for example, or an electrical generator circuit. In still other embodiments, power supply circuit 212 relies on externally-supplied power, such as from an AC mains source, and converts and conditions that power to the various supply taps for the other portions of node device 100.

Figure 3:
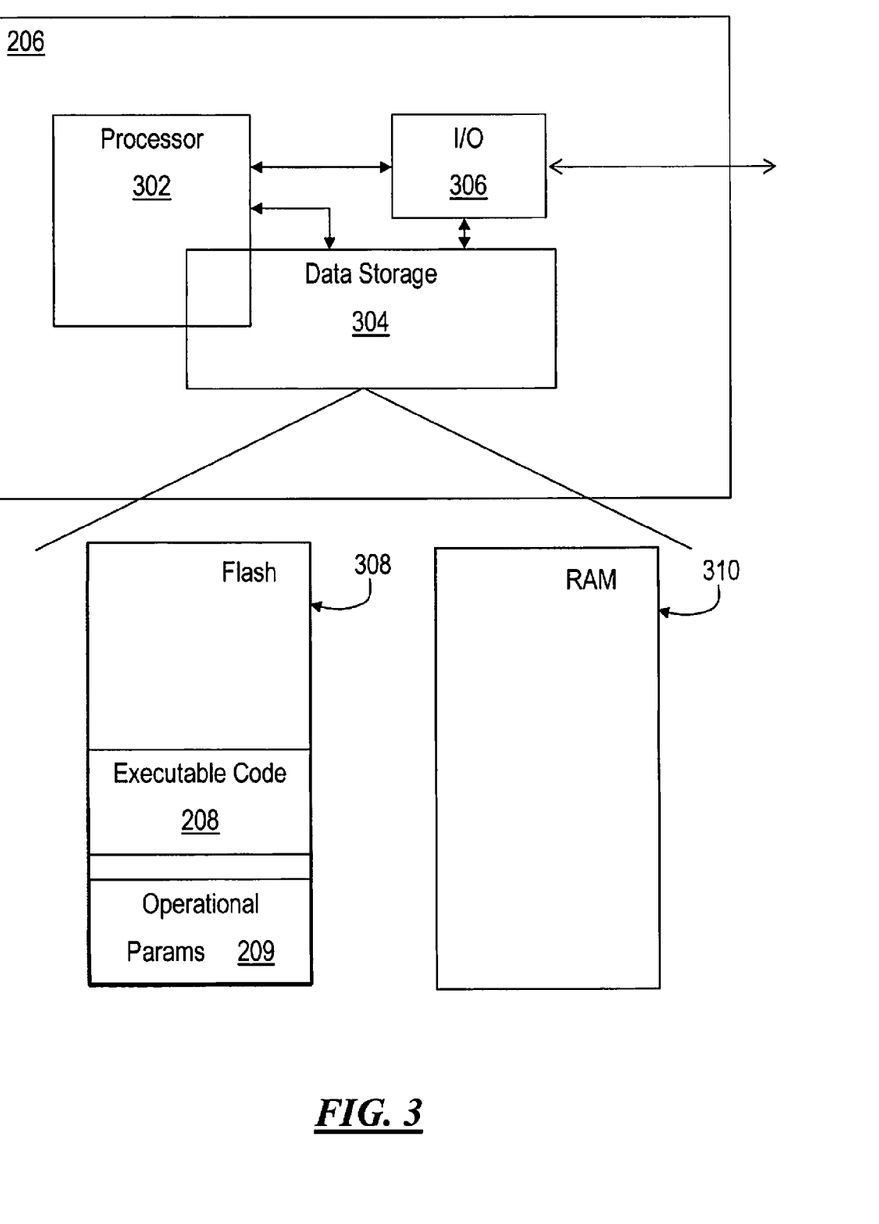
FIG. 3 is a block diagram illustrating parts comprising the controller of the exemplary node device of FIG. 2, including a data storage medium with program instructions and operational parameters.

FIG. 3 is a block diagram illustrating some of the components of controller 206 according to one embodiment. Controller 206 includes processor 302, which includes such parts (not shown) as a control unit, an arithmetic/logic unit (ALU), registers, cache memory, and the like. Processor 302 can include a single or multi-core processor of any suitable architecture (e.g., RISC/CISC), a microcontroller with integrated additional components, a digital signal processor (DSP), etc. Processor 302 is interfaced with data storage 304, which can take any of a variety of suitable forms, and their combinations. For example, RAM, electrically-erasable programmable read-only memory (EEPROM)—e.g., Flash, disk, and the like, or a combination thereof. In the case of a microcontroller embodiment, some of the data storage 304 may be integrated with the control unit and ALU, and other components, as represented by the partial overlap of these blocks in FIG. 3. Some parts of the data storage 304 may be situated externally to the processor 302. Input/output facilities 306 include circuitry such as a system bus interface that permits interfacing with other components of node device 100, including some portions of data storage 304 (such as the case with an external flash device interfacing via system bus).

Also depicted in FIG. 3 is an exemplary organization of content within data storage 304 according to one embodiment. In this example, data storage 304 includes a non-volatile memory devise, such a flash device 308, which may be part of a microcontroller embodiment of processor 302, or external to processor 302. Flash device 308 stores the executable code of software 208, along with operational parameters 209, and other variables that may be stored in the course of execution of software 208. Data storage 304 may also include a random access memory (RAM) device 310, which may be used to store parts (or all) of executable code 208 for faster access during execution, as well as "scratchpad" memory space.

With reference specifically to the functionality implemented by controller 206 operating under the control of the program instructions of software 208, a variety of operational modules are implemented. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor core(s) of controller 206. Accordingly, each module can be realized in a variety of suitable configurations, and should not be limited to any particular implementation exemplified herein.

The operational modules in one example embodiment, include such operations as communications (including forming message packets, forwarding messages addressed to other devices, message routing, error detection/correction, packet framing, following communications protocol, etc.), operation of data source 204, various security-related operations, receiving and processing commands, performing software upgrading-related operations, and others.

Table 1 below lists a set of abstraction layers that implement major portions of the communications functionality according to one embodiment. Although the abstraction layers describe a software architecture, it should be noted that the software architecture configures the controller hardware into a plurality of functional modules.

TABLE 1

Exemplary Abstraction Layers

| Layer | Data unit | Primary function(s) |
|---|---|---|
| Application | Data | Network process to data source |
| Network | Packet | Packetization of data; routing path determination |
| Radio Abstraction Interface (RAI) | | |
| SAR | Segment | Segmentation and reassembly of packet segments |

TABLE 1-continued

Exemplary Abstraction Layers

| Layer | Data unit | Primary function(s) |
|---|---|---|
| MAC | Frame | Coordination of the link state between two devices, including when link access may and may not occur; frame level authentication, and data reliability. |
| Link | Frame | Parsing and packing frames; connection/synchronization and reliable data delivery |
| Physical | Bits | Frequency, time and code synchronization and the modulation and demodulation of data across the physical radio medium. |

The application layer provides the communication system interface for data source 204. Accordingly, the application layer processes are passed data from data source 204 to be transmitted via radio circuit 202, and provide data received to data source 204 in the appropriate format. The network layer serves the application layer primarily by packetizing data for transmission. Packets generally contain portions of the data as a payload, and further include control information for routing the packet and reassembling the data it contains. In this exemplary implementation, routing is performed at the network layer. The radio abstraction interface (RAI) translates standardized function calls by the network layer to radio-specific or protocol-specific instructions for lower layers, and vice-versa. This allows the application and network layer codes to be universal to all radios and protocols which support the RAI.

The segmentation and reassembly (SAR) layer applies further coding to packets and, in dome implementations, further divides the packets. The medium access control (MAC) layer coordinates the link state between two devices, including when link access may and may not occur. In one embodiment, the MAC layer maintains a link connection state machine and insures the reliable delivery of data traffic via ACK/retransmission procedures. In a related embodiment, the MAC layer provides the mechanism to insure that the link is properly authenticated and lays the basis for establishing encrypted communications before data traffic is allowed to traverse the link.

The link layer provides lower-layer services to the MAC layer. In one such embodiment, the link layer handles the details of the link layer protocol, including parsing and packing the data messages into frames. In addition, link layer implements the connection/synchronization and reliable data delivery procedures.

In certain embodiments, messages that are communicated between node devices are generally sent using a connection-oriented protocol in which there is a handshaking process of negotiation between node devices before normal communication over the channel begins. Handshaking dynamically sets parameters of a communications channel established between the two node devices. It follows the physical establishment of the channel and precedes normal information transfer. Typically, this functionality is handled at the lower layers (i.e., MAC or link layer).

Figure 4:
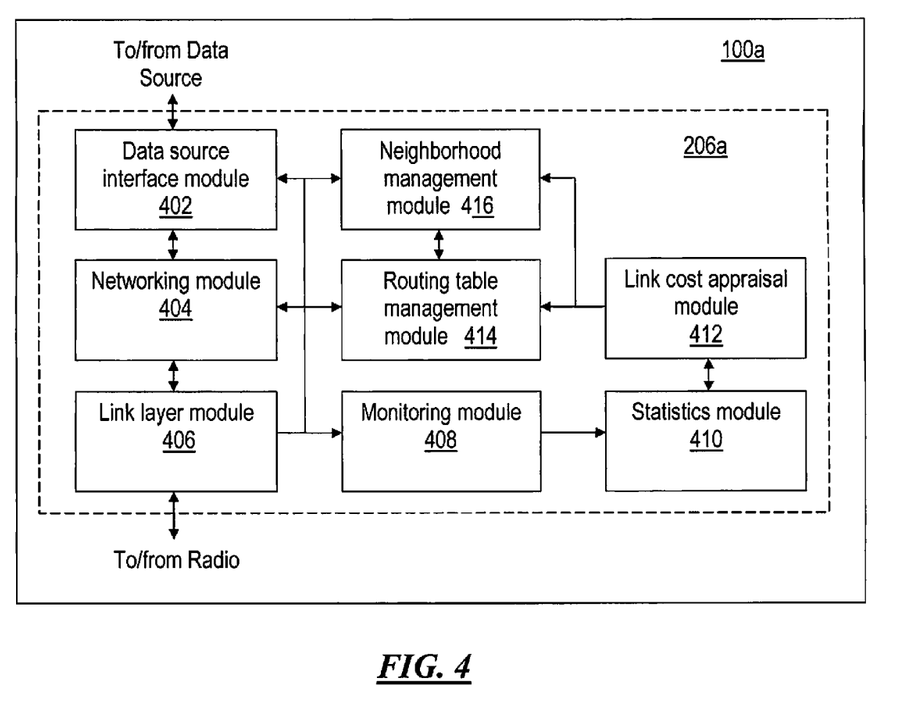
FIG. 4 illustrates some of the functional modules of the exemplary node device of FIG. 2, including a neighborhood management module, according to one embodiment.

Referring now to FIG. 4, some of the functional modules of an exemplary node device 100a according to one embodiment are illustrated. In the embodiment shown, node device 100a includes controller 206a with which modules 402-414 are realized. Data source interface module 402, which may be regarded as operating primarily at the application layer, exchanges raw data with the data source portion. Networking module 404, operating primarily at the network layer, performs packetization of data and routing functionality.

Link layer module 406 interfaces with the radio circuit and operates primarily at the link layer, carrying out the link layer operations described above. Monitoring module 408 monitors one or more transmission performance parameter, such as retransmissions, ACKs sent, failures to receive ACKs, data rate achieved, or other such observable parameter. This monitoring is performed based on transmissions sent using a connection-oriented protocol.

Statistics module 410 collects multiple samples of the transmission performance parameter values obtained by monitoring module 408, and performs a statistical summary of those multiple values. In one embodiment, the statistical summary represents a statistical summary, such as an average value, median value, or most frequent value. In a related embodiment, the summary statistic is weighted, for instance, a running average with greater weight attributed to more recent values.

Link cost (e.g., quality) appraisal module 412 performs the computation of link cost based on the statistical data for the actual communications links. The link cost metric in one embodiment can be expected transmission count (ETX). In other embodiments, other metrics, or combinations of metrics, may be utilized.

The link cost value is passed to routing table management module 414, which updates the routing information according to the predetermined link cost-based algorithm for routing. Networking module 404 makes reference to routing table management module 414, and performs updates of the routing tables as needed. In delivering data messages, the wireless network of FIG. 1 performs a dynamic routing scheme. The link quality assessment is used in conjunction with information derived from the visibility broadcasts and neighbor density assessment to adapt the device's communications channel operation. Neighbor density information derived from visibility broadcasts is used to set control parameters that allow node adaptation in the use of the communications medium, including for example adaptation of transmit data rates and/or power.

As discussed above, neighboring node devices regularly exchange various items of information relating to management of communications, such as neighbor lists, link costs, link load status, and other information for determining optimal routing paths. This management information may be exchanged using a connection-oriented protocol; or, in other embodiments, management information may be exchanged using a connection-less protocol, such as using datagrams. Either way, in dense networks, it can become unwieldy to manage high numbers of neighbors in this fashion.

According to one embodiment of the invention, neighborhood management module 416 is configured to obtain information from neighboring node devices, and to ascertain the density of the immediate neighborhood of node device 100a. Based on the density, various management decisions can be made to improve communications performance for the present neighborhood environment.

Figure 5:
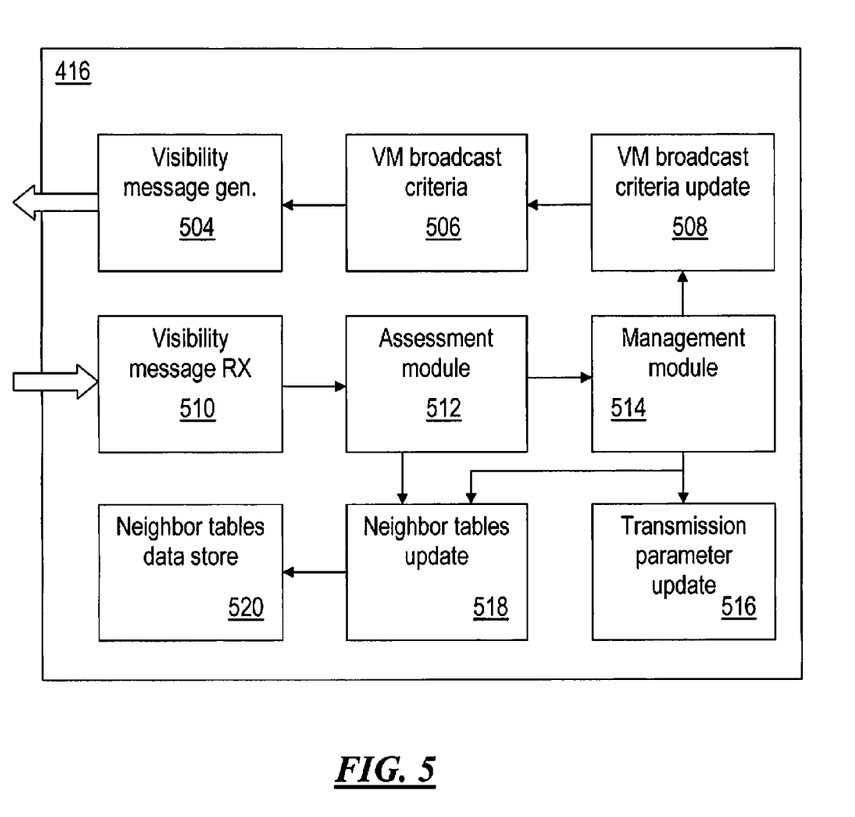
FIG. 5 is a diagram illustrating an exemplary set of modules within the neighborhood management module according to one embodiment.

FIG. 5 is a diagram illustrating an exemplary set of modules within neighborhood management module 416 according to one embodiment. Visibility message generation module 504 is configured to form a visibility message (VM) and pass the VM to the communications modules for broadcast transmission. The VM is a low duty cycle (i.e., relatively infrequent) broadcast message with specifically-defined information relevant for receiving node devices to be able to adaptively manage their neighbors with which it is most beneficial to communicate.

The VM is transmitted according to VM broadcast criteria 506, which in various embodiments can be defined as a passage of time (e.g., a defined number of clock cycles), as a response to the occurrence of some event (e.g., idling), or some combination thereof. In a related embodiment, the criteria 506 for broadcasting a VM provides for a variable VM transmission interval, that can be adjusted based on one or more prevailing conditions. According to this embodiment, a VM broadcast criteria update module 508 obtains information about the prevailing conditions, and applies decision logic to update the VM broadcast criteria such as the VM broadcast repetition rate. In one example, the prevailing conditions can a locally-determined node device density. This density determination can be based on a rate at which VMs from other node devices are being received (e.g., a count of VMs within a certain defined interval). In various embodiments, the VM broadcast repetition rate can range from 0.25 to 100 times per 24-hour period. More or less frequent VM broadcasts are certainly contemplated for other types of systems, though in the present examples, a relatively infrequent VM broadcast range on the order of 1-12 per 24-hour period is envisioned.

In one embodiment, the frequency with which VM broadcasts are transmitted is itself adapted according to the node's determined neighbor density.

Unlike the usual data messages transmitted between node devices, the broadcast VMs are connection-less broadcasts according to one embodiment. Thus, the communications and processing overhead associated with handshaking and other features of a connection-oriented protocol are avoided to the extent possible. Accordingly, in one embodiment, the VM is a packet or series of packets with a relatively small amount of header information and a relatively small payload. Moreover, in a related embodiment, the VMs are not addressed to any particular recipient. According to this approach, the VMs are meant to be received by any and all node devices that are within communications range of the broadcasting node device, and which happen to be receptive to on-air communications at the moment of the broadcast. Having this short format, VM broadcasts can be transmitted more quickly at a given data rate, thereby occupying less airtime than a longer unicast message identifying an addressee would occupy.

In one embodiment, the VM is transmitted at a standard power level, such as the maximum power level available at the node device. This feature facilitates making a uniform assessment by the recipient as to the signal strength of each of its neighboring node devices. Similarly, in a related embodiment, the VM is transmitted at a predefined and standard data rate. This data rate standardization further supports uniformity in appraising the quality of each received transmission. Faster data rates are more error-prone in noisy environments, while slower data rates are more robust in noisy environments, but also more prone to collisions since messages at the slower rates take longer to be transmitted. Thus, standardizing the power and data rates for VMs within a network tend to allow a fair comparison to be made among the various node devices by obviating the many variables associated with variable-power and variable-data rate devices.

In one embodiment, the VM includes the following information:
- Message type indicator that identifies the packet as a VM;
- An identifier of the transmitting node device, e.g., the node device's medium access control (MAC) Address;
- The time of the VM transmission;
- For node devices that repeat their VMs to increase the likelihood that each VM is received, the repetition number;
- An identifier of the serving gateway device for the transmitting node device (this is sometimes referred to as the "color" of the network or subnet);
- An identifier of path cost to the current serving gateway device. This can be in any suitable form, such as a measured or estimated ETX value, a hop count to the current serving gateway device, multiple items of information, or some aggregated or computed value based on a combination of factors;
- A measure of communications workload for the node device (this may be a statistical quantity such as a running average);
- A measure of neighborhood density for the node device (determined according to one or more of the approaches detailed below);
- The VM transmission interval setting which indicates the frequency with which the transmissions are being broadcast;
- Node device transmit power capabilities (e.g., is the device capable of transmitting at a reduced or increased power level?)
- List of nearest gateway devices.

This example set of information is not an exhaustive list. Also, it is contemplated for one embodiment that a only a portion of the above information is needed to allow node devices receiving the VM to make responsive adjustments. For example, in one such embodiment, only the following items are included: Message type indicator that identifies the packet as a VM, an identifier of the transmitting node device, and an identifier of path cost to the current serving gateway device. Some of the indicators listed above may be implicit in a particular network. For example, there may be only a single gateway device, or it may not be important which gateway device is used to transmit data. Also, the VM message may be identifiable from its content structure, i.e., without a separate message type indicator.

Visibility message receiver module 510 is configured to receive VMs sent from other node devices. The contents of each VM are passed from the lower layers to the network layer, where they are each parsed, and relevant data is extracted. The data is passed to assessment module 512, which evaluates one or more of the following parameters based on the received VM:
- Local node density;
- Potential path cost; and
- Apparent link quality to the VM broadcasting node.

Figure 6:
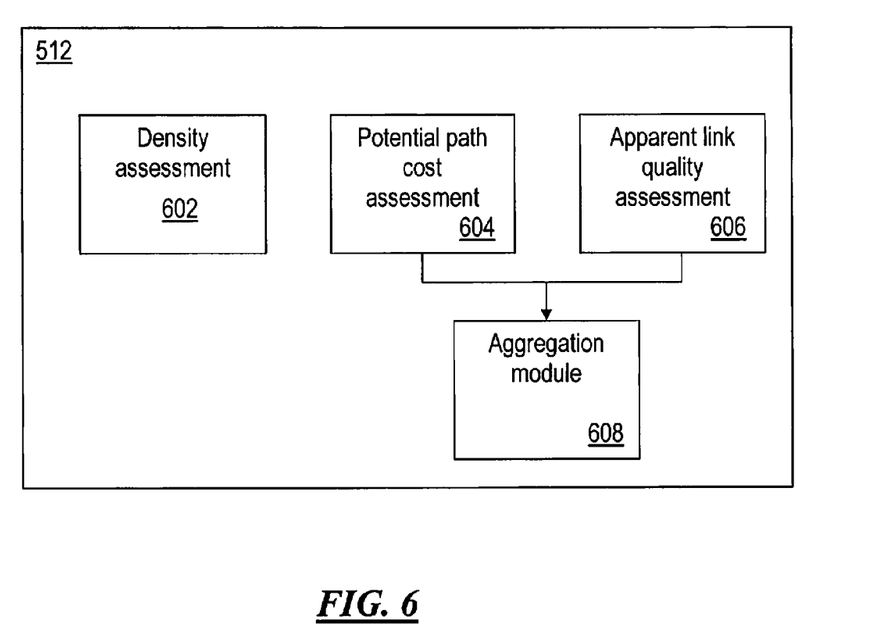
FIG. 6 illustrates exemplary functional modules within an assessment module according to one embodiment.

FIG. 6 illustrates exemplary functional modules within assessment module 512 according to one embodiment. Determination of the local node density can be accomplished by density assessment module 602. According to various embodiments, the assessment can be carried out in a number of ways. In one embodiment, as discussed above, the node density is determined based on the number of VMs received from different node devices within a monitoring interval. In another embodiment, the time interval is a rolling interval, e.g., the density is based on the number of VMs received from different node devices during the last n minutes and using information received on the frequency with which the particular VM is being transmitted by the given node. In another embodiment, density is based on an average time interval measured between successive VMs from different node devices (i.e., shorter average time interval would correspond to higher density). More generally, the node density is determinable based on VM receptions over time. In various embodiments, the node assessment can be represented as a numeric value (e.g., a count of distinct neighboring node devices within communications range, a score that is at least loosely based on the measured density, a scaled score (e.g., 0 to 100), or simply, a density categorization corresponding to low, medium, high, very high density, etc.

In another embodiment, neighbor density from VM broadcasts is also weighted to account for the power capabilities of the devices in a given neighborhood environment. Node devices with higher maximum transmit power capability effectively contribute a higher density measure than nodes that have a lower maximum transmit power level. This allows the neighbor density assessment to account for the net effect of population of devices with heterogenous transmit power capabilities operating within the network.

Potential path cost assessment module 604 makes its determination based on information contained in the VM. For instance, in an embodiment where the VM includes an indication of number of hops to the serving gateway, this indication can be used as a measure of potential communications performance of the node device from which the VM was received. In a related embodiment, the VM can include multiple indicia relating to path cost. For example, the VM may also include a measured path cost to the gateway, as measured by the node device transmitting the VM. Accordingly, in this type of embodiment, potential path cost assessment module 604 can be configured to compute a total path cost for each neighbor based on aggregating the various relevant indicators obtained from each neighboring node device's VM.

This information can then be used by the VM recipient device to determine the preferred neighbors for message routing. Notably, the path cost information contained in a VM does not necessarily reflect the actual monitored path cost—instead, it is an indicator provided by the VM-sending node device that represents that node device's determination of its path cost. In this regard, the potential cost differs from an actual measured link or path cost as determined by link cost appraisal module 412. In another embodiment, the path cost information included in the VM can be based on actual historic routing cost information maintained by the VM-sending node device.

The determination made by apparent link quality by assessment module 606 entails collecting observations in connection with reception of each VM. Such observations can include the received signal strength indication (RSSI) for each VM. In related embodiments, error detection or correction results are taken into account.

The potential path cost assessment and the apparent link quality assessment can each be a single most recent assessment based on the latest VM reception. In another approach, each assessment can include a historic component, i.e., it can be based on a plurality of received VMs, and can have the various individual assessments statistically combined in some suitable fashion, such as averaging, or weighted averaging with more recent assessments having greater weight assigned thereto.

In a related embodiment, the potential path cost assessment produced by module 604 is combined with the apparent link quality assessment from module 606 by aggregation module 608 to produce a total neighbor score. This combined score is thus based on path cost information provided by each neighboring node device, and on an actual physical link quality measurement observed by the receiving node device.

Referring again to FIG. 5, management module 514 associates the various assessments, or the total neighbor score, with the node device that originated each given VM. In one embodiment, the neighboring node device ID and its relevant assessments or score are stored in a data structure that represents a tuple, e.g., a vector or array, which can be added or updated into a neighbor management data structure. The density assessment module 602 provides its output to management module 514 as well.

In various embodiments, the density assessment is used by management module 514 to manage the message transmission operation of node device 100*a* in one or more respects. In one approach, management module 514 determines whether the density assessment has changed appreciably since the previous determination. This can be accomplished in one example by comparing the change in density against a change threshold; if the change threshold is met or exceeded, the management module 514 initiates updating of one or more operational parameters of node device 100*a*.

One type of operational parameter relates to the broadcasting of VM messages. In one embodiment, management module 514 can initiate an update of the VM broadcast criteria via VM broadcast criteria update module 508. Accordingly, in one example, a node device that receives more frequent VMs from different neighboring devices can reduce its VM broadcast rate by increasing its VM broadcast time interval. This type of adjustment corresponds to an inference being made that more frequent VM receptions corresponds to being in a higher-density neighborhood and, in turn, the higher-density neighborhood corresponds to having more routing options for effective and alternative route selection. Also, being in a higher-density neighborhood means that there is an increased likelihood of network congestion and collisions; thus, it is beneficial to reduce the on-air usage.

In one example embodiment, the rate of VM broadcasts by node device 100*a* has an inverse relationship to the rate at which VM messages are received from its neighboring devices. For example, the VM broadcast rate can be defined by the expression $$R_{VM} = \frac{\text{Max}}{1 + \frac{D}{100}},$$

where $R_{VM}$ is the VM broadcast rate being set, Max represents the maximum possible VM rate setting (defined by a configurable limit), and D represents the measured node density in the immediate neighborhood based on received VMs. In another embodiment, a lookup table is used in which various ranges of density assessments each corresponds to a VM transmission rate (or interval) to be set.

Another type of operational parameter relates to transmission of data and control messages using connection-oriented communications. Transmission parameter update module 516 handles these updates. In one approach, the transmission parameter that is updated is transmission power, which is adjustable in certain types of node devices. In a related embodiment, the data rate is likewise adjustable, and is selected based in part on the received VMs.

Accordingly, transmission parameter update module 516 applies a formula, a lookup table, or other suitable algorithm, to produce updated parameter settings. In one example, the transmission power is inversely related to the density assessment, such that in denser neighborhoods, less power is used to reduce the interfering effect of each transmission on more distant node devices. Similarly, in a related embodiment with adjustable data rate, the data rate is related to the assessed neighborhood density. Thus, for more dense neighborhoods with more frequent transmissions, the data rate is increased so as to minimize the on-air time of each message transmission.

In a related embodiment, the transmission parameter update module 516 further takes into account other transmission performance measures, such as those provided by monitoring module 408 or statistics module 410. These performance measures can indicate whether the target data rate is actually being achieved. In noisy environments, or in environments with various intermittent obstructions, the transmission power or data rate is further adjusted up or down to either ensure successful, error-free communications, or (when the target performance is being met or exceeded), to reduce the on-air presence in the communications channel.

Neighbor tables update module 518 receives information from management module 514 relating to the VM-transmitting node devices, and their corresponding assessments, or total neighbor score. Based on this information, the neighbor tables are either populated, or updated according to predefined neighbor table maintenance criteria. The neighbor tables themselves are maintained in neighbor tables data store 520.

Figure 7:
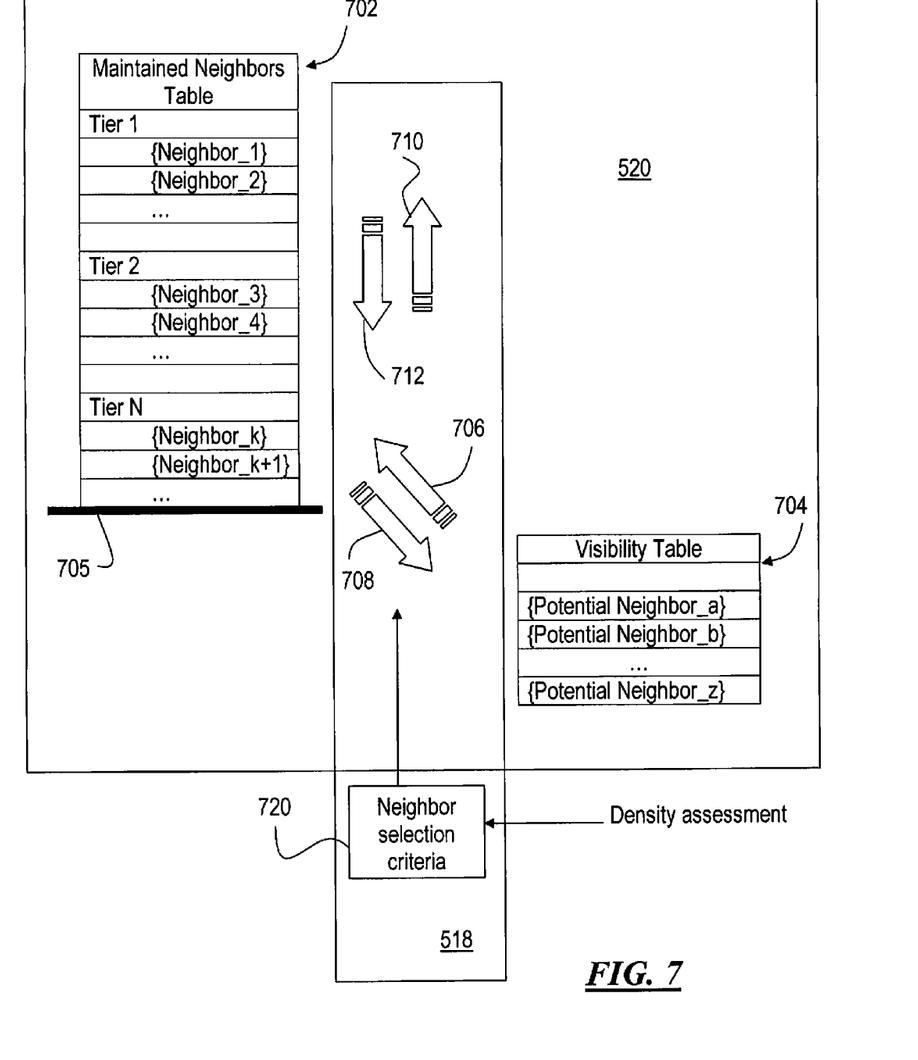
FIG. 7 is a diagram illustrating an exemplary structure of a neighbor tables data store, and operation of a neighbor tables update module according to one embodiment.

FIG. 7 is a diagram illustrating an exemplary structure of neighbor tables data store 520, and operation of neighbor tables update module 518 according to one embodiment. The neighbor management technique according to this embodiment distinguishes between neighbor devices which are maintained, and neighboring devices, which are visible, but are not actively utilized as neighbors for data communications purposes. In the embodiment depicted, separate data structures are maintained for these different classes of devices. Maintained neighbors table 702 lists the active neighbors; whereas visibility table 704 lists neighboring devices that could potentially be made active neighbors.

In one type of embodiment, each entry in tables 702 and 704 is in the form of a tuple which includes an ID of the corresponding neighbor device, and its assessed path cost, assessed apparent link quality, its total neighbor score, or some combination of these parameters. In a related embodiment, each tuple includes the information provided in each corresponding VM (or some selected items therefrom), along with the computed assessments or scores.

Maintained neighbor table 702 is associated with at least one limit 705 that limits the size of the maintained neighbor list. This mechanism helps to control the overhead associated with maintaining these neighbors. Visibility table 704 may or may not be associated with such a limit, and it is contemplated that in dense networks visibility table 704 can be much larger than maintained neighbors table 702. Node devices can be promoted and demoted to and from maintained neighbors table 702. A node device from visibility table 704 can be promoted, as depicted at 706, to maintained neighbors table 702 if neighbors table update module 518 determines that node device to be preferable (e.g., having a reduced path cost, having a better signal strength, or both) over another device in table 702. To respect limit 705, a device deemed less preferable to a promoted device is demoted to visibility table 704, as indicated at 708.

In a related embodiment, maintained neighbors table 702 is organized such that neighbor node devices are ranked and sorted according to best actual or potential path to a network gateway device. In a related embodiment, as depicted, the list 702 is further organized into multiple tiers, e.g., Tier 1, Tier 2, . . . , Tier N. Devices assigned to the highest tier (i.e., Tier 1) are deemed primary neighbors. Primary forward neighbors are those node devices that are used as a next hop in the route to the gateway. All the node devices that use the local node device 100*a* as a next hop in their own routes to the gateway are considered as primary reverse neighbors. Thus, primary neighbor node devices are the combined set of primary forward neighbors and primary reverse neighbors.

Other neighbors with which contact is maintained have the potential to be promoted or demoted, as the case may be, as indicated at 710 and 712, respectively. Primary neighbors are subject to demotion only, since they are at the highest tier though this only occurs when they are no longer on the routing path for traffic through and from the node's serving gateway. The non-primary neighbors of the lower tiers can be used for message routing as alternate paths in cases where the primary neighbors are not functioning or are not able to perform at their usual performance level (e.g., due to a high workload at certain times).

Primary neighbors are established and maintained on an equal priority at a relatively high service level. In other words, these node devices receive management frames more often than the node devices in the lower tiers. For node devices in the lower tiers of table 702, management communications are established at a generally uniform rate, albeit a lower rate than for the higher tier(s). This approach helps to prioritize and reduce overall neighbor maintenance overhead by focusing these resources on the highest-performing neighbor node devices.

The neighbor nodes in visibility table 704 allows node device 100*a* to keep track of neighbor nodes for which a VM has been received and that provide the next best set of candidate neighbors beyond those already in the maintained neighbors table 702. Thus, visibility table 704 can be regarded as an overflow of the managed neighbors table 702. Visibility table 704 keeps track of node devices as potential neighbors but based on their path cost ranking are considered less likely than those in the managed neighbors table 702 to provide an optimal routing path to a network gateway device. By maintaining an ordered list of candidate neighbor devices the neighbor management approach according to various embodiments can lead to a faster and more direct response to degradation of a primary routing path. In finding an alternative connectivity path, the neighbor candidates can be directly assessed according to their currently-maintained path cost prioritization. Node device 100*a* may thus be able to find an alternative path if needed without having to randomly alternate through multiple neighbors based just on the pre-programmed neighbor access time.

Initially, when a node device comes online, it receives VM broadcasts from neighboring devices and places those neighboring devices into maintained neighbors table 702 until the system-configured neighbor limits 705 are reached. Once in the managed neighbors table 702, the non-primary neighbors are maintained in an ordered ranking based on path cost. As new neighbors are observed they are ranked based on information provided within the corresponding VM and appropriately ordered within the maintained neighbors table 702. When the neighbor limits 705 are reached, newly-observed nodes are only selectively placed into the maintained neighbors table 702.

This can be done in a variety of ways. For instance, newly-discovered node devices can be automatically added to the visibility table 704, and evaluated for possible promotion 706 at a next evaluation/table management cycle performed by neighbor tables update module 518. In another approach, newly-discovered node devices can be immediately evaluated against node devices in maintained neighbors table 702, and placed appropriately based on that evaluation.

In a related embodiment, a temporary data store (not shown) is maintained, in which received VM information is stored. Data from a relatively large plurality of VMs can be stored in this temporary data store until the information can be processed by assessment module 512 and acted upon by management module 514. This exemplary architecture permits the node device to use its computing resources for other purposes, such as various other communication-related activity, interaction with the data source, etc., while VMs arrive. The VMs can be processed at a later time when the computing resources become more available.

In one type of embodiment, a set of neighbor selection criteria 720 is applied by neighbor tables update module 518 in order to assign neighboring node devices to the appropriate table, and in order to promote/demote the neighboring node devices between tables 702 and 704, and between the various tiers within table 702. The neighbor selection criteria itself can be subject to adjustment based on the density assessment provided by module 602.

In one example embodiment, the neighbor selection criteria defines variable weighting to be applied to the various node device performance measures. For instance, in response to a determination of very high neighborhood density, node devices from which VMs having relatively higher RSSI values are appraised preferentially over node devices having smaller hop counts or path costs. This criteria setting supports local neighborhood communications optimization because the neighboring devices having the best RSSI can presumably communicate with node device 100a using a lower transmission power setting and a higher transmission data rate, thereby having a lower on-air communications channel utilization. This type of decision logic may contradict conventional routing path formation logic since routing decision-making generally emphasizes reduction of path cost, and is generally not concerned with reducing communication channel utilization.

Notably, the structure or arrangement of data structures for storing neighbor information can be suitably adapted into a variety of forms within the spirit of the invention. For instance, instead of two separate tables as depicted in FIG. 7 and described in the above examples, tables 702 and 704 can be incorporated as a single table. In this approach, the records of table 704 can be assigned to a lower tier, which is treated in the same manner as the records of visibility table 704. This can be accomplished using the same element of each tuple that represents the tier assignment, and by adapting the limit 705 to apply only to the tiers corresponding to maintained neighbors.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A node device for use with a wireless multihop network containing a plurality of other node devices, each node device being within communication range, through a wireless communications medium, of one or more neighboring node devices located in a corresponding local neighborhood, the node device comprising:
    communication circuitry, and a controller interfaced with the communication circuitry, the controller including a processor and a non-transitory data storage medium containing instructions executable on the processor, that, when executed, cause the controller to implement a neighborhood management module that includes:
    a visibility message generation module that generates visibility messages to be transmitted via connection-less broadcast, the visibility messages including at least an identifier of the node device;
    a received visibility message assessment module that processes visibility messages received by the node device from the one or more neighboring node devices to determine a measure of density of the local neighborhood; and
    a management module that initiates updating of an operational parameter of the node device relating to utilization of the wireless communications medium by the communication circuitry, wherein a degree of utilization of the wireless communications medium by the node device is adjusted, at least in part, according to an inverse relation to the measure of density of the local neighborhood determined based on the received visibility messages; and
    a neighbor tables data store that is configured to store, in a non-transitory data storage medium, at least one data structure that identifies, in a first portion, neighboring node devices with which connections are established, and that identifies, in a second portion, neighboring node devices with which connections are not established but from which visibility messages are received, wherein a neighbor selection criterion is applied by a neighbor tables update module associated with the neighbor tables data store to initiate an update of the at least one data structure.

2. The node device of claim 1, wherein the degree of utilization of the wireless communications medium by the node device is adjusted based on predefined link quality requirements for communications with each individual neighbor.

3. The node device of claim 1, wherein the communications circuitry transmits the visibility messages at a standard transmission power setting that is standardized among all node devices of the network.

4. The node device of claim 1, wherein the communications circuitry transmits the visibility messages at only a maximum transmission power setting.

5. The node device of claim 1, wherein the visibility message includes information indicative of a path cost to at least one gateway device.

6. The node device of claim 1, wherein the visibility message includes an identifier of a gateway device.

7. The node device of claim 1, wherein the visibility message includes a measure of a local node's current network traffic handling.

8. The node device of claim 1, wherein the visibility message includes information indicative of a capability of a node device that is the originator of the visibility message to support communications at a given maximum transmission power level from among a plurality of different power levels.

9. The node device of claim 1, wherein the visibility message includes information indicative of a capability of a node device that is the originator of the visibility message to support communications at a given maximum data rate of message transmissions from among a plurality of data rates.

10. The node device of claim 1, wherein the measure of density is based on a quantity of received visibility messages from different node devices during a monitoring interval.

11. The node device of claim 1, wherein the measure of density is based on a rate of reception of visibility messages from different node devices during a monitoring interval.

12. The node device of claim 1, wherein the operational parameter includes a transmission power setting.

13. The node device of claim 1, wherein the operational parameter includes a transmission data rate setting.

14. The node device of claim 1, wherein the operational parameter includes a criterion establishing a repetition rate of visibility message transmission by the node device.

15. The node device of claim 1, wherein the operational parameter includes a neighbor selection criterion for selecting, from among the one or more neighboring node devices, a subset of one or more active neighbors with which connections are to be established.

16. The node device of claim 1, wherein the received visibility message assessment module associates each one of the received visibility messages with an apparent link quality assessment based on reception of that visibility message.

17. The node device of claim 1, wherein the received visibility message assessment module processes each one of the received visibility messages to obtain, based on information content of that visibility message, a potential path cost assessment representing a path cost of the neighboring node device that originated that visibility message, and associates that path cost assessment with a record of that neighboring node.

18. The node device of claim 1, wherein the first portion of the at least one data structure is subject to a size limit that limits a number of neighboring node devices with which connections may be established.

19. A method for operating a node device in a wireless multihop network, each node device being within communication range, through a wireless communications medium, of one or more neighboring node devices located in a corresponding local neighborhood, the method comprising:

generating visibility messages to be transmitted via connection-less broadcast, the visibility messages including at least an identifier of the node device;

processing visibility messages received by the node device from the one or more neighboring node devices to determine a measure of density of the local neighborhood;

initiating updating of at least one operational parameter of the node device relating to utilization of the wireless communications medium by the node device, wherein a degree of utilization of the wireless communications medium is adjusted at least in part according to an inverse relation to the measure of density of the local neighborhood determined based on the received visibility messages; and storing in a neighbor tables data store that is configured to store, in a non-transitory data storage medium, at least one data structure that identifies, in a first portion, neighboring node devices with which connections are established, and that identifies, in a second portion, neighboring node devices with which connections are not established but from which visibility messages are received, wherein a neighbor selection criterion is applied by a neighbor tables update module associated with the neighbor tables data store to initiate an update of the at least one data structure.

20. A node device for use with a wireless multihop network, each node device being within communication range, through a wireless communications medium, of one or more neighboring node devices located in a corresponding local neighborhood, the node device comprising:

means for generating visibility messages to be transmitted via connection-less broadcast, the visibility messages including at least an identifier of the node device;

means for processing visibility messages received by the node device from the one or more neighboring node devices to determine a measure of density of the local neighborhood;

means for initiating updating of at least one operational parameter of the node device relating to utilization of the wireless communications medium by the node device, wherein a degree of utilization of the wireless communications medium is adjusted in inverse relation to the measure of density of the local neighborhood determined based on the received visibility messages and on the link quality requirements for communications with each individual neighbor; and means for storing in neighbor tables data store that is configured to store, in a non-transitory data storage medium, at least one data structure that identifies, in a first portions, neighboring node devices with which connections are established, and that identifies, in a second portion, neighboring node devices with which connections are not established but from which visibility messages are received, wherein a neighbor selection criterion is applied by a neighbor tables update module associated with the neighbor tables data store to initiate an update of the at least one data structure.

* * * * *